US 6,554,228 B2

(12) United States Patent
Schoonmaker et al.

(10) Patent No.: US 6,554,228 B2
(45) Date of Patent: Apr. 29, 2003

(54) AERODYNAMIC FAIRING

(75) Inventors: Michael J. Schoonmaker, Evergreen, CO (US); George Sowers, Morrison, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/795,221

(22) Filed: Feb. 28, 2001

(65) Prior Publication Data

US 2002/0104928 A1 Aug. 8, 2002

Related U.S. Application Data

(60) Provisional application No. 60/185,915, filed on Feb. 29, 2000.

(51) Int. Cl.$^7$ ................................................. B64G 1/00
(52) U.S. Cl. ..................... 244/158 R; 244/54; 244/130; 244/172; 244/63
(58) Field of Search ............................. 244/158 R, 160, 244/54, 130, 172, 63

(56) References Cited

U.S. PATENT DOCUMENTS

| | | | |
|---|---|---|---|
| 4,650,139 A | 3/1987 | Taylor et al. ................ 244/161 |
| 4,850,275 A | 7/1989 | Utreja et al. ................ 102/293 |
| 4,884,770 A | 12/1989 | Martin .................... 244/158 R |
| 5,131,610 A | 7/1992 | Demange ................ 244/158 R |
| 5,143,327 A | 9/1992 | Martin .................... 244/158 R |
| 5,242,135 A | 9/1993 | Scott ...................... 244/158 R |

OTHER PUBLICATIONS

Article in Aviation Week & Space Technology: "EELV Competitors Seek To Achive Performance Goals" p. 54, 55, 56, 57, 58, and 60. vol. 151, No. 24 Dated Dec. 13, 1999.

Primary Examiner—J. Woodrow Eldred
(74) Attorney, Agent, or Firm—Marsh Fischmann & Breyfogle LLP

(57) ABSTRACT

An aerodynamic fairing which is mountable on a strap on solid rocket motor (SRM) is configured such that in flight aero-acoustic effects are significantly reduced with regard to the launch vehicle to which the SRM is mounted and other external apparatus. The aerodynamic fairing is configured to include a leading edge which is substantially flat and provides the forward intersection between the inboard and outboard sides of the fairing. On mounting the fairing and SRM to a launch vehicle, the inboard surface is closest to the launch vehicle while the outboard surface is further away. With regard to the aerodynamic fairing, the transition rearward from the leading edge to a base end, the inboard surface is initially flat and transitions to the cylindrical shape of the SRM. The outboard surface of the fairing is configured such that it has a profile of a canted ogive which extends from the leading edge and smoothly transitions to the cylindrical shape of the SRM at the base end.

19 Claims, 8 Drawing Sheets

A-A

B-B

AERODYNAMIC FAIRING

RELATED APPLICATIONS

This application claims priority under 35 U.S.C. §119 to prior U.S. Provisional Patent Application Serial No. 60/185,915, filed Feb. 29, 2000, the entirety of which is hereby incorporated by reference.

FIELD OF THE INVENTION

The present invention relates to an aerodynamic fairing apparatus, and more particularly to an aerodynamic fairing apparatus connectable to external bodies on a flight vehicle which is specially configured to reduce convergent flow between bodies as well as reduce flow separation and reattachment.

BACKGROUND OF THE INVENTION

Rocket motors are currently widely employed for a number of uses in the world of aviation and astronautics. These uses may include launching payloads into space as part of a spacecraft, or as the propulsion source of a launch vehicle. Rocket engines are generally of two types. The first type is a liquid rocket engine which uses one or more propellants, mixes them, and then burns the fuel in a combustion chamber. Liquid rocket engines provide a large amount of thrust per pound, and are typically employed in all launch vehicles that are employed in manned space flight. Liquid rocket engines are in some cases designed for varying amounts of thrust and in some cases may be shut off and subsequently restarted.

A second type of rocket engine is a solid rocket motor (SRM). This type of engine burns a solid propellant inside a pressure tube. The solid propellant has both fuel and oxidizer mixed together and that fuel may be burned from the end up, or more commonly from the center outward. Once started a solid rocket motor cannot be shut off until it burns itself out. These types of motors are most commonly used as the propulsion source for missiles because they can be used quickly and without delay.

Recently the number of payloads which are being launched into space has increased. As the weight of the payloads and the height of the desired orbits has increased (for example, geosynchronous orbit) the benefits of liquid and solid rocket motors have been combined in providing high-powered launch vehicles. In one configuration, one or more solid rocket motors may be attached to the external surface of a launch vehicle and/or liquid rocket motor. The solid rocket motors provide for the lift off and initial propulsion of the vehicle to a desired staging altitude where the liquid rocket motor is then employed for a controlled flight into orbit.

SUMMARY OF THE INVENTION

The inventors have recognized that when strap on rocket motors are employed in conjunction with a flight vehicle, the aerodynamic shape of the strap on rocket motor while traveling at high speeds may generate aero-acoustic effects with regard to the launch vehicle, other strap on rocket motors and any enclosures on the exterior of the launch vehicle. As such, the inventors have identified an aerodynamic fairing configuration for use on strap on rocket motors which reduces aero-acoustic (vibrational and turbulence) effects with regards to the launch vehicle and other bodies mounted in close proximity.

Described herein is a aerodynamic fairing which is configurable to be mounted on a substantially cylindrical body such as a strap on rocket motor, which in turn is mounted and employable on a launch vehicle such as a liquid fueled rocket. The aerodynamic fairing is shaped such that convergent flow between the strap on rocket motor and the launch vehicle is significantly reduced. Further, other surfaces of the fairing are configured to direct air flow in a desired direction and are shaped such that a smooth transition is created between the fairing and the strap on rocket motor to avoid the separation and reattachment of airflow.

In one configuration of the invention, the aerodynamic fairing is connectable to another body. The aerodynamic fairing which is mountable hereon is configured with a leading edge which is substantially straight and has a width which is substantially equal to the diameter of the strap on rocket motor. The leading edge is a intersection between the radially inboard and radially outboard surfaces of the aerodynamic fairing. The radially inboard surface of the aerodynamic fairing is configured such that beginning at the leading edge, it is substantially flat and straight going aft, and is configured to transition from the flat shape to a cylindrical shape at the base end. The radially outboard surface is shaped such that it includes a circular arc of large radius. This radius is defined to generate a surface that intersects the leading edge and connects to the aft cylinder without slope discontinuity. As with the radially inboard surface, the radially outboard surface transitions from an edge to the cylindrical shape of the strap on rocket motor at the base end. The base end includes a circular cross-section such that the fairing may be connected to the strap on rocket motor.

The body to which the fairing is connectable may be cylindrical in shape. In yet another configuration of the invention the cylindrical body may be an strap on rocket motor. The fairing may be configured such that a shoulderless configuration is provided when the fairing is mounted on the strap on rocket motor. The fairing may further include a cylindrical portion which provides for mounting the fairing on the strap on rocket motor.

The strap on rocket motor with the fairing mounted thereon may be connectable to a core body such as a launch vehicle. The launch vehicle may be at least partially configured as a liquid rocket motor. The strap on rocket motor and fairing may be connectable to the launch vehicle such that the inboard surface of the fairing is in closest proximity to the core body. The strap on rocket motor and fairing combination may also be mounted on the launch vehicle in close proximity to other bodies mounted on the launch vehicle. These other bodies may include other strap on rocket motor's or enclosures on the exterior of the core body. These enclosures may be employed to house various equipment for the launch vehicle such as electronics.

In yet another configuration of the invention, the aerodynamic fairing described herein may include a base end which is configured to be connectable to a cylindrical body. The base end may include a substantially circular cross section defined by a plurality of azimuthal reference points defining longitude located along a perimeter of the circular cross section extending from a most inboard point on the circular cross section to a most outboard point.

Extending from the base end may be a body portion of the fairing which includes an exterior surface definable by a plurality of traces each of which extend from one of the plurality of longitudinal reference points forward from the base end. The traces are measured in planes parallel to a centerline for the cylindrical body and perpendicular to an inboard reference plane. In defining the shape of the aerodynamic fairing, the intersection of the traces with the inboard reference plane define a leading edge portion for the fairing. Further, each of the traces define an arc, wherein the measured radius for the arcs increase from a minimum measured radius at the most outboard point of the fairing to a maximum radius measured at a most inboard point.

In yet another configuration of the invention the trace measured along the most inboard point is substantially flat. When the fairing is connected to a cylindrical strap on rocket motor and mounted on a launch vehicle, the fairing is oriented such that the most inboard point is in closest proximity to the launch vehicle.

DETAILED DESCRIPTION

Figure 1:
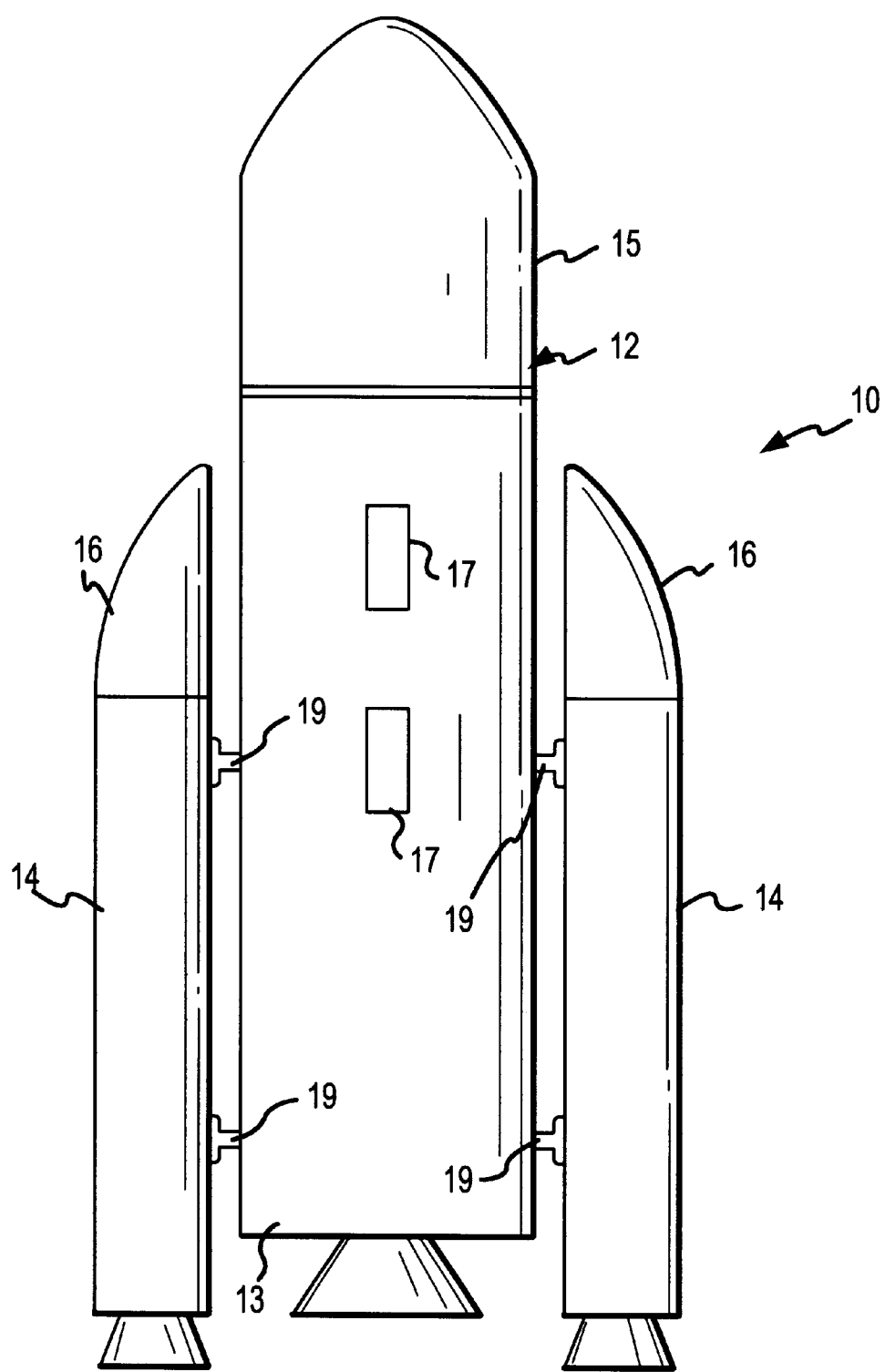
FIG. 1 discloses a launch vehicle with multiple strap on rocket motors attached thereto.

Disclosed in FIG. 1 is a view of one configuration of a launch vehicle 10 with which the aerodynamic fairing described herein may be employed. The launch vehicle 10 may comprise a core body 12 which may be substantially cylindrical in shape and includes a payload carrying portion 13 as well as a liquid fuel tank 15. On the exterior of the launch vehicle 10 may be one or more electronic enclosures 17.

The configuration of the launch vehicle 10 disclosed in the FIG. 1 includes one or more strap on rocket motors 14. The strap on rocket motors may comprise a solid rocket motor, a liquid rocket, or an type of cylindrical strap on rocket motor known to those skilled in the art. The strap on rocket motors are fixed to the core launch vehicle with forward and aft attachments 19.

In the configuration shown in FIG. 1, the strap on rocket motors are employed in conjunction with a liquid rocket motor. The strap on rocket motors are used to boost the launch vehicle to a staging altitude. Once their fuel is spent and the desired altitude is reached, the strap on rocket motors are separated from the launch vehicle. The liquid rocket motor is then employed to propel the launch vehicle to its desired destination.

As is seen in FIG. 1, each of the strap on rocket motors 14 includes an aerodynamic fairing 16. Because of the velocity with which rockets travel through the atmosphere, aerodynamic considerations must be addressed for both the launch vehicle and the strap on rocket motors. As is seen in FIG. 1, the launch vehicle 10 includes a fairing and typically, the nosecone of the strap on rocket motor is also conical in shape. While a conical shaped nosecone may work well for a cylindrical launch vehicle, other shapes may be used for the strap on rocket motor which improve the airflow between the various bodies in close proximity.

More specifically, when a conical nosecone is used with a strap on rocket motor, various amounts of convergent flow will be generated between the strap on rocket motor and the launch vehicle as well as between other strap on rocket motors. For example, in some applications, up to five motors will be used simultaneously on a particular launch vehicle and the convergence of the flow field between the motors using conventional conical design causes increased aeroacoustics. Further, a conical nosecone typically includes a angular shoulder which provides an abrupt transition between the nosecone portion and the cylindrical body. The sharp edge between nosecone and cylinder typically triggers flow separation and reattachment aft of the shoulder which produces high aero-acoustics.

Referring again to FIG. 1, the typical conical nosecone for the strap on rocket motor 14 has been replaced by a specially configured aerodynamic fairing 16. In general, this aerodynamic fairing is configured to provide a smooth transition between the fairing and the rocket motor body so as to reduce flow separation and reattachment, as well as reducing the funneling of air flow between the various bodies which reduces the creation of convergent flow and turbulence.

The aerodynamic fairing described herein incorporates several features to mitigate aerodynamically induced acoustics. One feature includes a radically flattened tip of the fairing which reduces converging flow between the strap on rocket motors. Further, the contour of the fairing on the side next to the launch vehicle, as well as between the strap on rocket motors, is relatively straight which keeps airflow lines parallel and unperturbed between the various bodies. The canted ogive outer profile of the aerodynamic fairing minimizes separated flow and the subsequent reattachment.

Figure 2A:
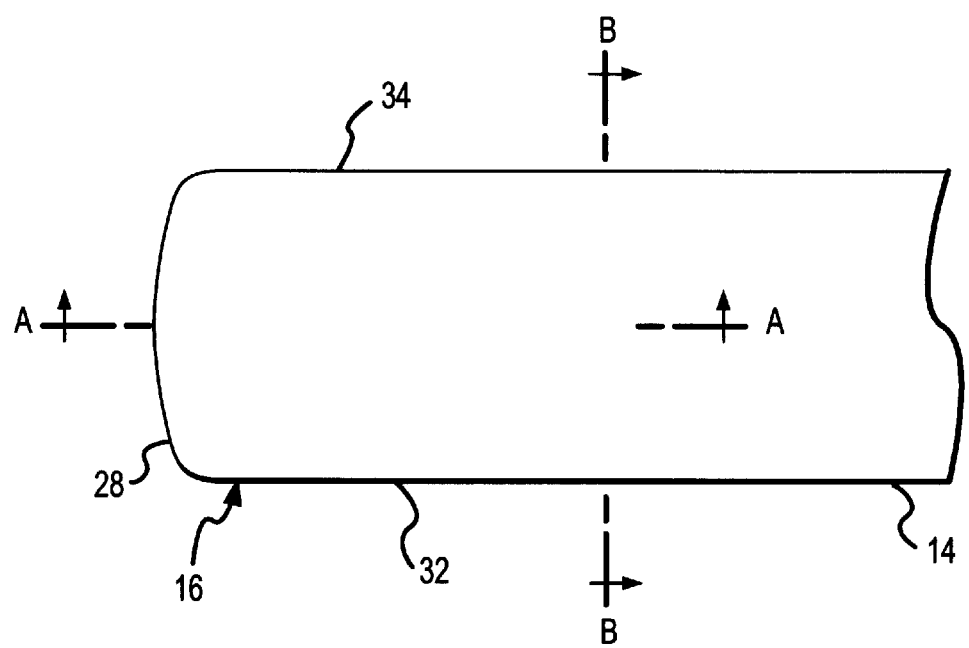
FIGS. 2a–c disclose top and cross-sectional views of the aerodynamic fairing.
Figure 2B:
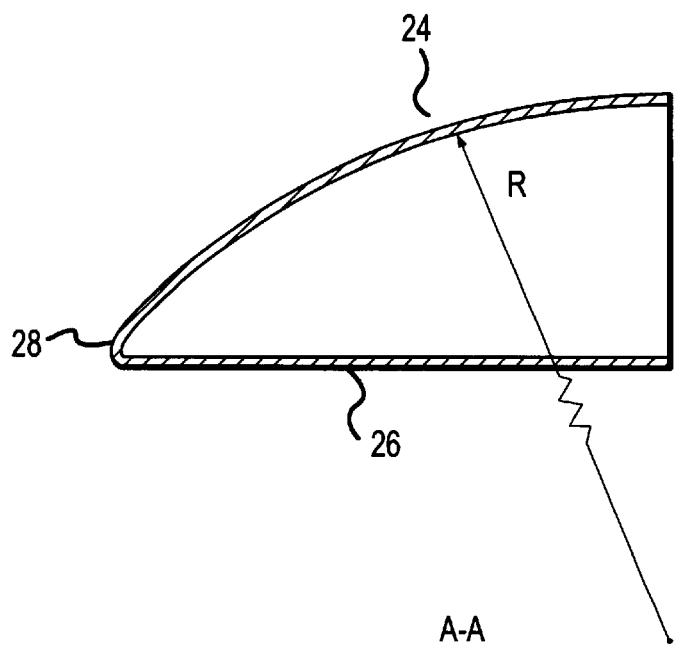
Figure 2C:
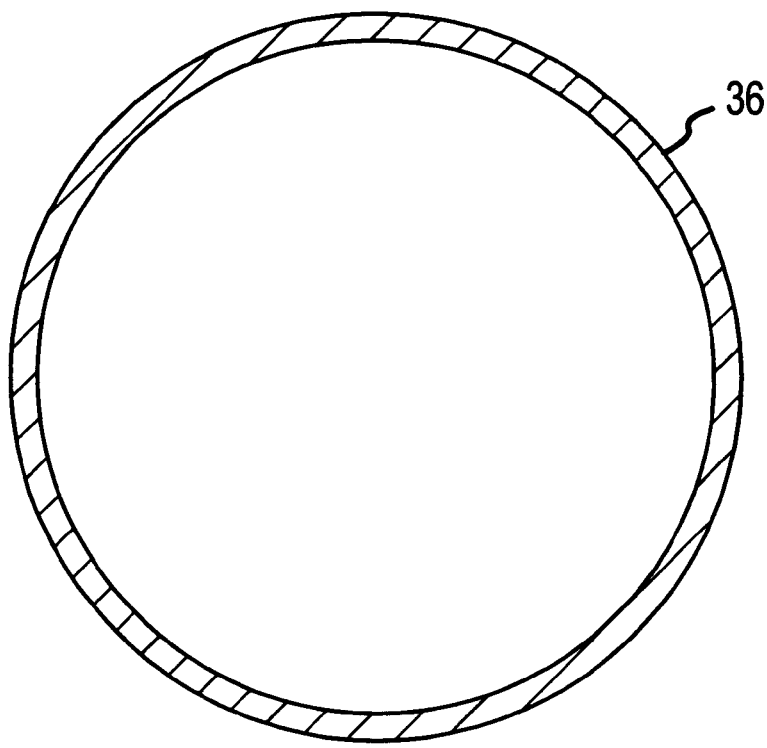

In order to get a better understanding of the shape of the aerodynamic fairing disclosed in FIGS. 2a–c are various view of this apparatus. Disclosed in FIG. 2b is a top view of the fairing looking down on the radially outboard surface. As can be seen, the aerodynamic fairing 16 includes a leading edge portion 28. The leading edge is symmetric around the centerline through the fairing, and may have a sweep to it to account for shock waves which form during supersonic flight. The leading edge 28 has a width which is substantially equal to the diameter of the cylindrical body to which the fairing attaches. Extending rearward from the leading edge 28 are sides 32 and 34. As can be seen, sides 32 and 34 are substantially straight such that the fairing maintains a constant width from leading edge 28 to base end 36. Sides 32 and 34 provide a smooth transition to the outer profile of the strap on rocket motor, so as to eliminate flow separation and reattachment.

Disclosed in FIG. 2b is a cross section of the aerodynamic fairing 16 taken along the centerline in order to show the ogive profile of the fairing. As can be seen, the outboard and inboard surfaces of the aerodynamic fairing include two distinct shapes, The radially inboard surface 26 of the aerodynamic fairing is relatively flat and extends rearward from the leading edge 28 to the base end 36. As a point of reference, the inboard surface 26 along the cross section shown, is substantially configured in an inboard reference plane which is parallel to a centerline through the cylindrical portion of the strap on rocket motor, and tangent to the inboard surface of the cylindrical body to which the fairing attaches.

In the description of the aerodynamic fairing provided herein, in order to provide points of reference, there will be a discussion of surfaces substantially configured in geometric planes, or parallel to certain reference points such as the centerline for cylinders. The use of this type of descriptive information is merely used to facilitate an understanding of the shape of the fairing and is not meant to limit the scope of the invention. One skilled in the art would understand that in designing a aerodynamic fairing such as that described herein, certain surfaces may be curved or swept in order to account for aerodynamic effects. Further, certain surfaces which are described as in a particular plane may be offset in any direction for a reasonable distance and would still fall within the scope of the invention.

In contrast to the inboard surfaces, outboard surface 24 has a ogive profile which extends rearward from the leading edge 28 to the base end 36. As can be seen, the canted ogive profile provides a smooth transition to the outer profile of the strap on rocket motor 14. The canted ogive profile reduces the separation and reattachment of airflow.

Disclosed in FIG. 2c is a cross-sectional view of the base end 36. As can be seen, it is substantially cylindrical in shape and matches the shape of the strap on rocket motor to which the fairing connects. Included in the end of the aerodynamic fairing are the means employed to attach the fairing to the strap on rocket motor. The aerodynamic fairing may be further configured to include a cylindrical length of substantially the same dimensions as the strap on rocket motor. In one configurations of the invention, the aerodynamic fairing may be formed out of graphite epoxy, however the fairing could be formed out of any number of metallic or composite materials.

Figure 3:
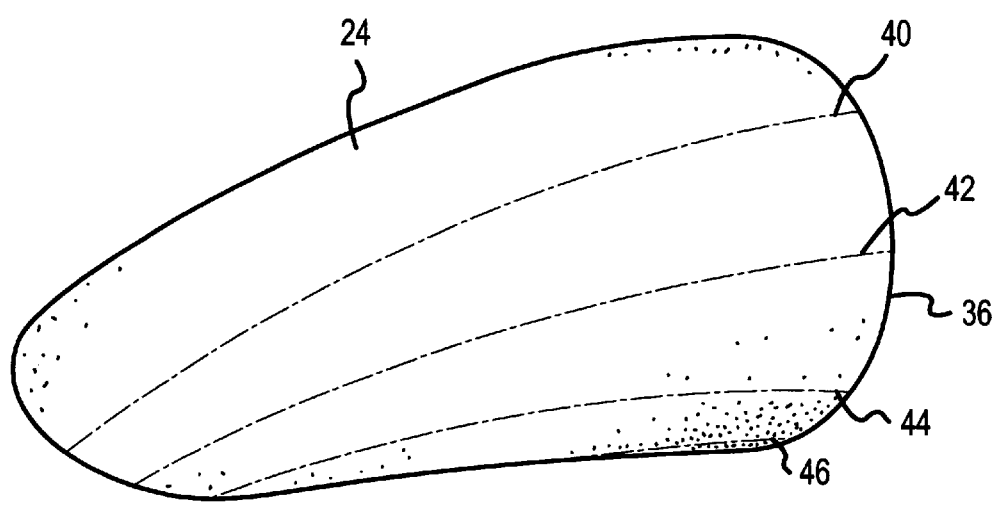
FIG. 3 discloses a perspective view of the aerodynamic fairing.

Disclosed in FIG. 3 is a perspective view of the aerodynamic fairing 16 which shows in particular the transitions in shape for the various external surfaces. Seen in particular is the transition from the inboard surface 26 to the outboard surface 24. Additionally it is seen that the nose portion of the outboard surface is substantially flat near the leading edge 28 and aerodynamically transitions to the shape of a cylinder at the base end 36. The transition of the inboard surface 26 from substantially planar near the leading edge 28 to cylindrical at the base end 36 is also apparent. This transition occurs while the aerodynamic fairing maintains a substantially constant width.

Also shown in FIG. 3 are a number of traces, 40–46, which extend from longitudinal reference points around the perimeter of the base end 36. These traces, which will be described in greater detail in FIG. 4, are taken along geometric planes which are both parallel to a centerline through the cylindrical body to which the fairing is attachable and perpendicular to an inboard reference plane within which inboard surface 26 is configured. As will be seen, each trace defines a unique arc and the radius' of the various arcs increases as measurements are made from a most outboard point on the fairing to a most inboard point.

Figure 4A:
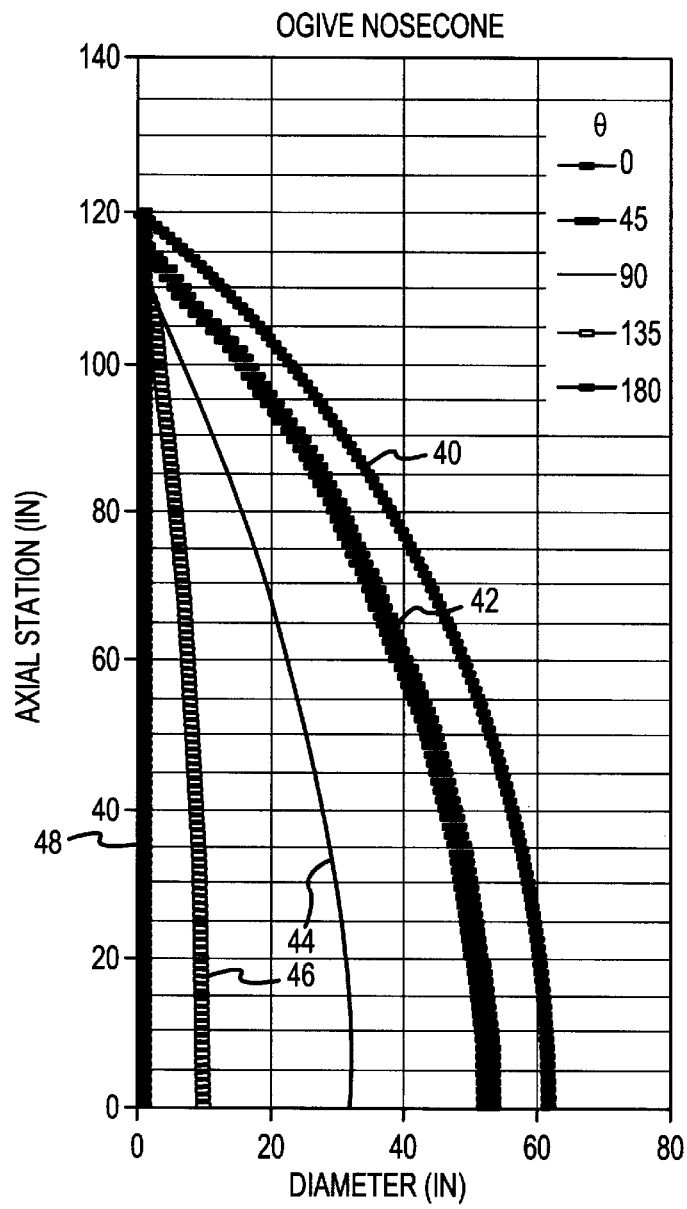
FIG. 4a discloses a graph which includes axial station vs. diameter for the radially outboard contour of the aerodynamic fairing and FIG. 4b discloses a cross-sectional view of the launch vehicle and nosecone to provide reference points for radial locations around the aerodynamic fairing.
Figure 4B:
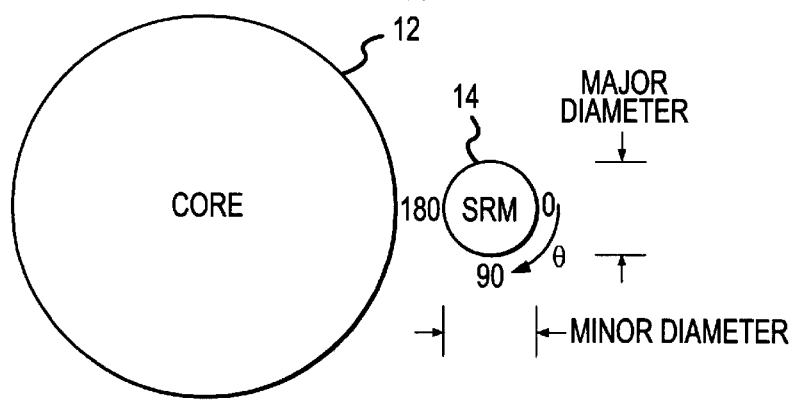

In order to provide a better understanding of the transition from the canted ogive radius outboard section to a substantially flat inboard section, a graph is provided in FIG. 4a which includes the traces 40–48 taken along the exterior surface of the fairing from designated points around the cylindrical exterior of the base end. In order to provide a frame of reference, the diagram in FIG. 4b provides a cross-sectional view of the fairing at the point where it joins the strap on rocket motor, as well as a cross-sectional view of the launch vehicle core. As will be described in greater detail below, the orientation of the aerodynamic fairing with regard to the launch vehicle is important. In particular, the theta equals zero degree point corresponds with the point on the exterior of the fairing which is most outboard with reference to the core of the launch vehicle. Theta is defined clockwise as viewed from above. The 180 degree point corresponds with the point on the strap on rocket motor which is most inboard with reference to the launch vehicle body. Vertical stations are defined from zero at the base end to 120 inches at the leading edge.

Returning again to the graph in FIG. 4a, it is seen that trace 40 which extends from the zero degree point to the leading edge is a circular arc. As was described above, this arc is configured such that a smooth transition is provided between the fairing and strap on rocket motor. The intersection of this arc with the inboard reference plane described above also defines one point along the leading edge of the fairing.

Trace 42 taken from the 45 degree reference point along the perimeter of the base end also defines an arc. The arc defined by trace 42 has a larger radius than that of trace 40. As was described above, in order to reduce the amount of convergent flow between the strap on rocket motors, the sides of the aerodynamic fairing are fairly straight and the fairing inboard surface transitions from the circular shape of the strap on rocket motor to a substantially flat surface at the leading edge. This is indicated by viewing the trace 44 extending from the 90 degree point. As can be seen, trace 44 defines an arc which has a greater radius than both traces 40 and 42. This flattening is also apparent in the perspective view provided in FIG. 3. Also, it is seen that that the intersection of the traces 40, 42 and 44 with the inboard reference plane also define points along the leading edge.

Moving to traces 46 And 48, it is seen that the increase in radius for the arcs increases for the traces which extends from the 135 degree reference point and the 180 degree reference point, respectively. This increase in radius is directly attributable to the flattened sides and bottom of the aerodynamic fairing. Because the aerodynamic fairing is symmetric about the centerline of the strap on rocket motor, the portion of the aerodynamic fairing between the 180 degree point and the 360 degree point is a mirror image of that which is described above between the 0 and the 180 degree point.

Figure 5:
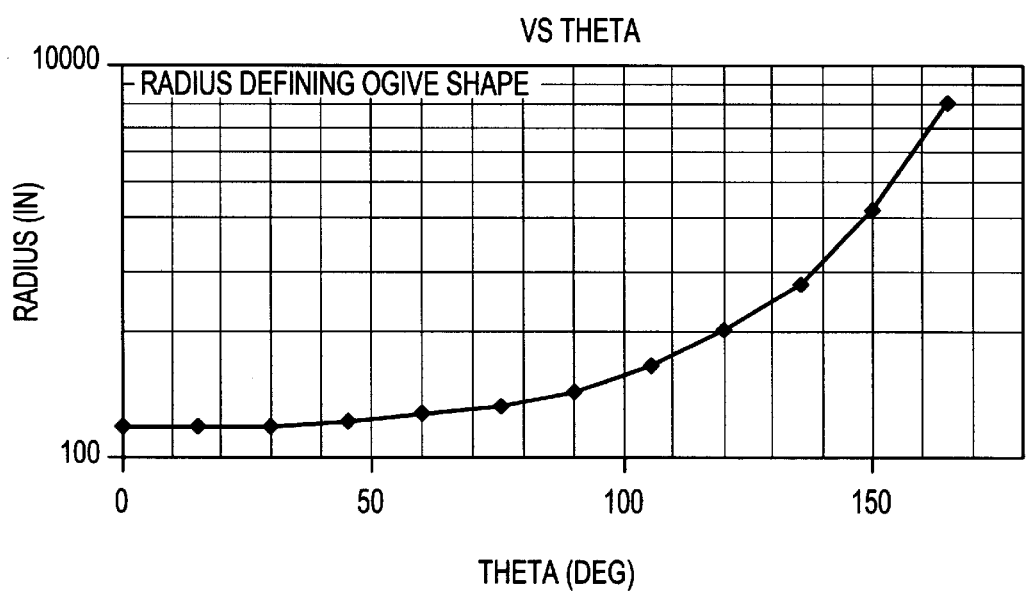
FIG. 5 discloses a graph which shows the outer radius of the aerodynamic fairing at locations around the circumference of the section which connects with the strap on rocket motor.

In order to provide further description as to the shape of the aerodynamic fairing, the graph disclosed in FIG. 5a presents the external radius of the aerodynamic fairing at point along the circumference of the base end. As with the graph in FIG. 4a, the selected points correspond with those noted in FIG. 4b. Radius values are measured in geometric planes which are coplanar with the centerline and intersect the radial point. Returning again to FIG. 5a, it is seen that at the zero degree point the radius is at a minimum reflecting the greatest curvature. As was noted, all longitudinal cuts are circular arcs providing smooth transitions from the leading edge to the strap on rocket motor body. As arc radius values are measured at the other points around the circumference, the radius initially remains fairly constant indicating the smooth transition of curvature around the fairing. However, as measurements are taken at points on the diameter positioned closer to the launch vehicle, the radius significantly increases indicating a flattening of the surface. This flattening increases dramatically until the 180 degree point (most inboard point) is reached. Because the aerodynamic fairing is symmetric about the plane through the zero and the 180 degree points, the values for points between 180 degrees and 360 degree will be a mirror image of those values described above.

In order to better understand the geometric transition in shape between the leading edge of the aerodynamic fairing and the base end, a series of cross-sections of the aerodynamic fairing at predetermined intervals are provided in FIGS. 6b–k. The cross sections are taken in equally spaced planes along the centerline of the strap on rocket motor. The spacing of the cross-sections is shown in particular in the side view of the fairing disclosed in FIG. 6a. In the example configuration shown herein, the aerodynamic fairing is approximately 120 inches long with a maximum diameter of approximately 62 in. at the base end.

As is seen in FIG. 6k, the cross sectional shape which is taken at the base end is substantially circular and matches the cross sectional shape of the strap on rocket motor at the connection point. At this cross-section, the minor and major diameters of the cross-section are the same length and the centerline through the strap on rocket motor matches the center point of this particular cross-section. As can be seen in the transitions through the other cross-sections 6j-6a, the length, of the minor diameter decreases in accordance with the arc of the canted ogive shape. With regards to this change in shape, it should be noted that the relative position of the lower endpoint of the minor diameter remains constant with reference to the centerline of the strap on rocket motor, even as the length of the minor diameter changes.

Figure 6:
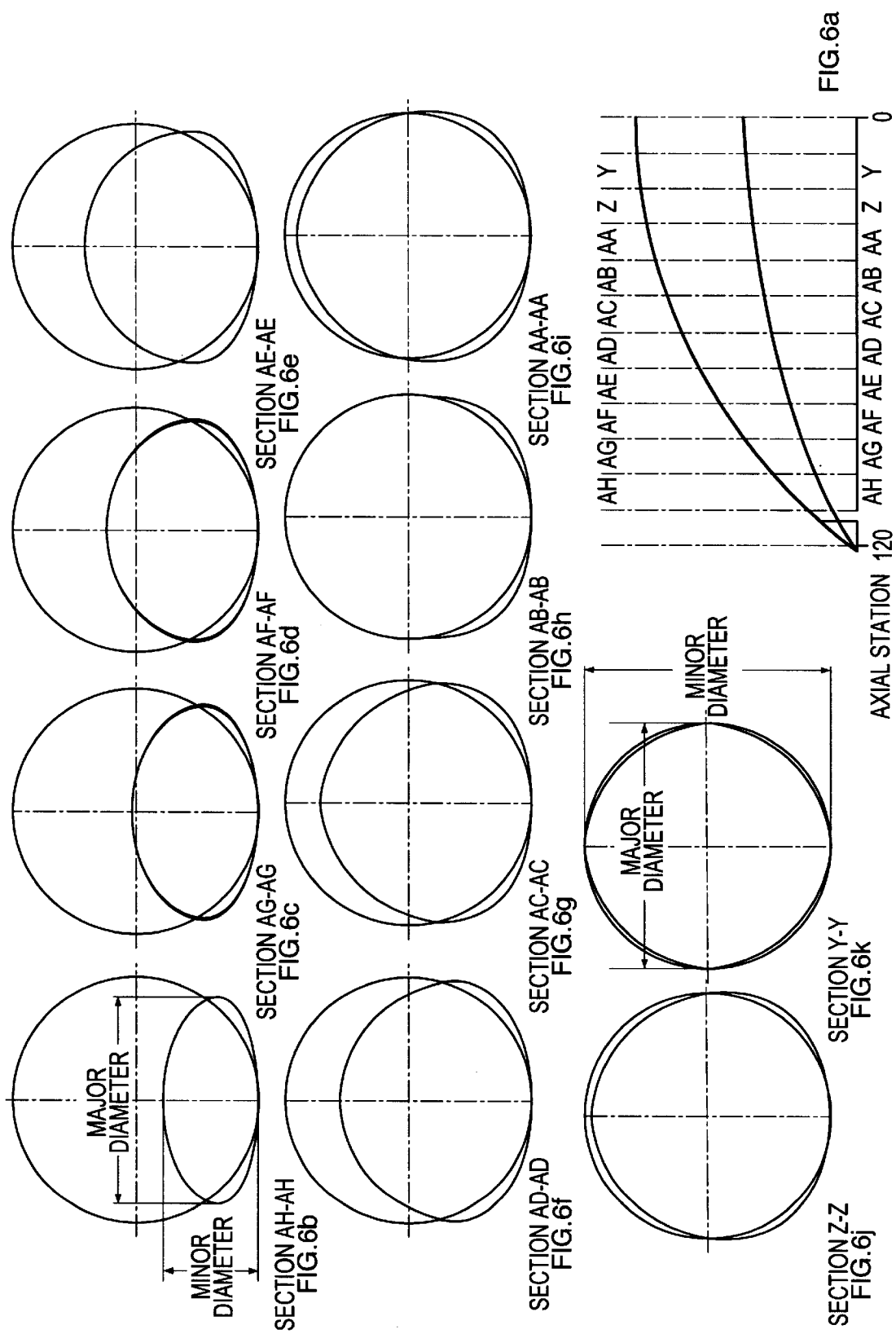
FIG. 6a discloses a side view of the radially outboard surface of the fairing, while FIGS. 6b–k disclose multiple cross-sectional views of the aerodynamic fairing from forward to aft.

What also remain substantially constant in the cross sections of FIG. 6, is the length of the major diameter. As described above, because the width of each cross section remains constant this reduces the instances of convergent flow between two or more strap on rocket motors mounted on a launch vehicle. Further, it is seen, that the inboard surface of the aerodynamic fairing flattens at a rate which is greater than the outboard surface, such that the cross-section near the leading edge shown in FIG. 6b has elliptical features, but is not a perfect ellipse.

As is made clear in the series of cross sections shown in FIG. 6, the inboard surface of the aerodynamic fairing (that part of the fairing that is mounted closest to the launch vehicle) is substantially flat, and the sides of the aerodynamic fairing (that portion of the fairing which is mounted closest to other apparatus (other strap on rocket motors, electronic enclosures, etc.) which are also mounted on the launch vehicle) are substantially straight starting at the leading edge back to the base end. As was discussed above, the flattened and straight inboard surface and straight sides reduce the creation of convergent flow between the various bodies.

Figure 7:
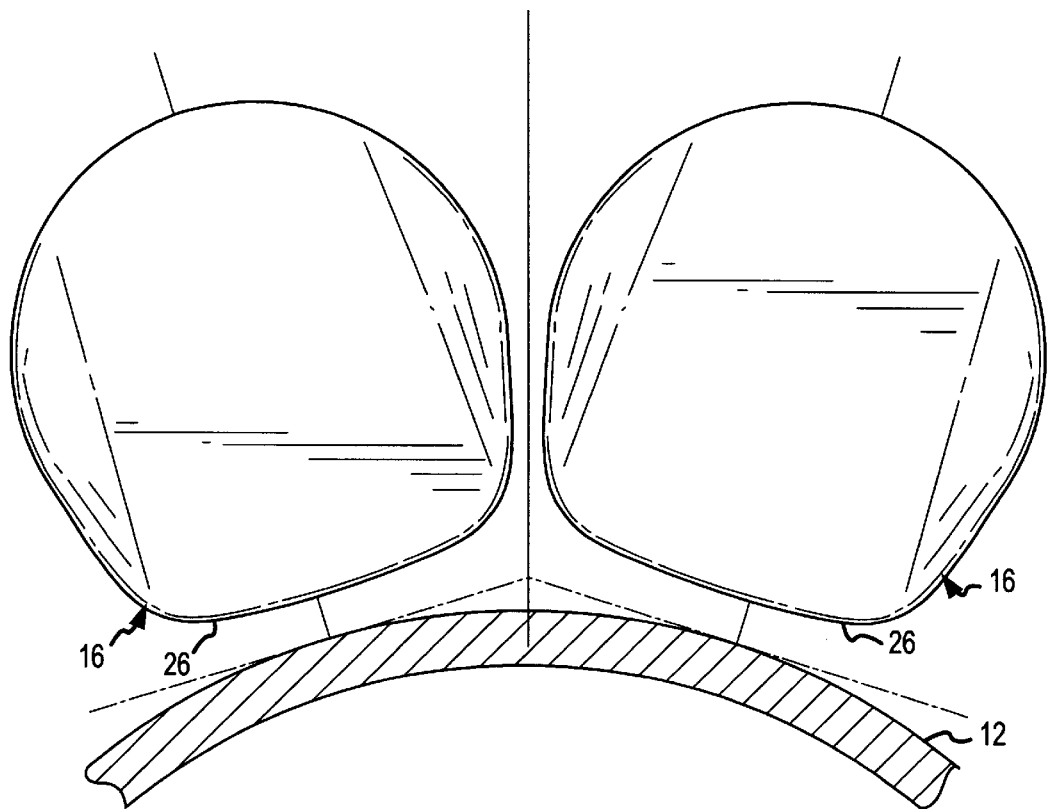
FIG. 7 discloses a view of multiple strap on rocket motors with aerodynamic fairings mounted on a launch vehicle.

In order to understand how the fairings are to be oriented relative to the launch vehicle and other strap on rocket motors, a diagram is disclosed in FIG. 7 which shows a cross sectional view of the launch vehicle core 12, wherein the launch vehicle has two strap on rocket motors mounted thereon. As can be seen, the aerodynamic fairing 16 is mounted on the strap on rocket motor at a particular orientation relative to the launch vehicle 12. In particular, it seen that the inboard edge 26 for each aerodynamic fairing is oriented in a position which is parallel to the cylindrical launch vehicle surface. Further, it is seen that the substantially straight sides of the aerodynamic fairing are oriented in positions near parallel to the sides of other aerodynamic fairings.

Another feature apparent from the diagram shown in FIG. 7, is the flattened loading edge, This leading edge is employed such that airflow is funneled in a direction away from the launch vehicle and other strap on rocket motors. More specifically, the flow is directed up over the canted ogive shaped outboard surface, and then down the exterior of the strap on rocket motor in a manner which significantly reduces flow separation and reattachment. Employing the aerodynamic fairing design described herein, local acoustic reductions of 10 dB were measured, and average reductions of 4 dB were obtained. The practical benefit of this design is that in flight vibrations of the flight critical avionics and flights critical components are significantly reduced. Further, the aerodynamic drag is also reduced resulting in a slight performance gain.

The foregoing description of the present invention, has been presented for purposes of illustration and, description. Furthermore, the description is not intended to limit the invention to the form disclosed herein. Consequently, variations and modifications commensurate with the above teachings, and the skill or knowledge of the relevant art, within the scope of the present invention. The embodiments described hereinabove are further intended to explain best modes known for practicing the invention and to enable others skilled in the art to utilize the invention in such, or other, embodiments and with various modifications required by the particular applications or uses of the present invention, It is intended that the appended claims be construed to include alternative embodiments to the extent permitted by the prior art.

What is claimed is:

1. An aerodynamic, fairing, comprising:
   a base end comprised of first and second portions, wherein said base end is configured to be connectable to a cylinder shaped portion of a body;
   a leading edge portion, configured, in a inboard plane, where said inboard plane is substantially parallel to the centerline for the cylinder shaped portion and substantially tangent to an inboard reference plane, wherein the leading edge is substantially symmetric about the centerline and has a width which is substantially equal to the diameter of the cylinder shaped portion;
   a inboard surface configured to extend from the leading edge to the base end along a first line coplanar with the bottom plane and parallel to the center line, where said bottom surface is further configured to maintain the width and transition to form the first portion of the base end; and
   a outboard surface which is substantially opposite the inboard surface and extends from the leading edge towards the base end, where the outboard surface is configured with a canted ogive cross section in a second plane, where the second plane is substantially coplanar with the centerline and substantially perpendicular to the inboard plane, wherein the outboard surface is further configured to maintain the width and transition to form the second portion of the base end.

2. The aerodynamic fairing of claim 1 wherein the body is cylindrical in shape.

3. The aerodynamic fairing of claim 2 wherein the body is a strap on rocket motor.

4. The aerodynamic fairing of claim 3 wherein the strap on rocket motor is a solid rocket motor.

5. The aerodynamic fairing of claim 3 wherein the strap on rocket motor is connectable to a launch vehicle.

6. The aerodynamic fairing of claim 5 wherein the launch vehicle is a liquid rocket motor.

7. The aerodynamic fairing of claim 1, wherein the base end is connectable with the body in a shoulderless fashion.

8. The aerodynamic fairing of claim 1, wherein the base end includes a cylindrical shaped portion employable for connecting with the body.

9. A launch vehicle apparatus comprising:
a main body which includes an external surface wherein at least one external body is mountable thereon;
at least one strap on rocket motor which is substantially cylindrical in shape and is connectable to the main body, wherein at least one solid rocket motor includes an aerodynamic fairing connectable at one end, wherein said aerodynamic fairing comprises:
a base end comprised of first and second portions, wherein said base end is configured to be connectable to a cylinder shaped portion of a body;
a leading edge portion configured in a inboard plane, where said inboard plane is substantially planar to a centerline for the cylinder shaped portion and substantially tangent to an exterior surface for the cylinder shaped portion, wherein the leading edge has a width which is substantially equal to the diameter of the cylinder shaped portion;
a inboard surface configured to extend from the leading edge to the base end along a first line which is coplanar with an inboard reference plane and parallel to the center line, where said inboard surface is further configured to maintain the width and transition to form the first portion of the base end; and
an outboard surface which is substantially opposite the inboard surface and extends from the leading edge towards the base end, where the outboard surface includes a canted ogive cross section in a second plane, where the second plane is substantially coplanar with the centerline and substantially perpendicular to the inboard reference plane, wherein the outboard surface is further configured to maintain the width and transition to form the second portion of the base end.

10. The apparatus of claim 9 wherein the body is substantially cylindrical in shape.

11. The apparatus of claim 10 wherein the body comprises a liquid fuel rocket engine.

12. The apparatus of claim 9 wherein a plurality of the strap on rocket motors are mounted in close proximity on the main body.

13. The apparatus of claim 9 wherein the main body has at least one external enclosure mounted thereon and at least one SRM is mounted in close proximity to the at least one enclosure.

14. An aerodynamic fairing apparatus, comprising:
a base end configured to be connectable to a cylindrical body, wherein the base end includes a substantially circular cross section defined by a plurality of azimuthal reference points defining longitudes along a perimeter of the circular cross section extending from a most inboard point on the circular cross section to a most outboard point;
a body portion extending from the base end, wherein an exterior surface of the body portion is defined by a plurality of traces each of which extend from one of the plurality of reference points in planes parallel to a centerline for the cylindrical body and perpendicular to an inboard reference plane, wherein an intersection between each of the plurality of traces and the inboard reference plane define a leading edge for the fairing and each of the plurality of traces define an arc wherein a radius measured for each of the arcs for the plurality of traces continually transitions from a maximum radius for an outboard trace extending from the most outboard point to a minimum radius for an inboard trace measure from the most inboard point.

15. The apparatus of claim 14 wherein the most inboard trace is substantially flat.

16. The apparatus of claim 14 wherein the body comprises a strap on rocket motor.

17. The apparatus of claim 15 wherein the strap on rocket motor with the fairing apparatus connected thereto is mountable on a substantially cylindrical launch vehicle with the most inboard point in closest proximity to the substantially cylindrical launch vehicle.

18. The apparatus of claim 14 wherein the base end further comprises a cylindrical portion which is employable for attaching to the cylindrical body.

19. The apparatus of claim 14 wherein the base end is connectable with the cylindrical body in a shoulderless fashion.

* * * * *